US006907854B2

(12) United States Patent
Wikner

(10) Patent No.: US 6,907,854 B2
(45) Date of Patent: Jun. 21, 2005

(54) FAN SHROUD WITH INTERNAL ASPIRATOR

(75) Inventor: Aaron David Wikner, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/675,617

(22) Filed: Sep. 30, 2003

(65) Prior Publication Data

US 2005/0066931 A1 Mar. 31, 2005

(51) Int. Cl.$^{7}$ ............................ F02B 77/00; F01D 1/00; B01D 59/50

(52) U.S. Cl. ............................... 123/198 E; 123/41.49; 55/385.3; 55/439; 55/DIG. 28; 415/223

(58) Field of Search .......................... 123/198 E, 41.49; 55/385.3, 439, 467, DIG. 28; 415/211.1, 223

(56) References Cited

U.S. PATENT DOCUMENTS

| | | |
|---|---|---|
| 5,427,502 A | 6/1995 | Hudson |
| 6,588,524 B2 | 7/2003 | Keen et al. |

*Primary Examiner*—Noah P. Kamen

(57) ABSTRACT

A fan shroud is provided having upper and lower sections. The sections are designed to mateably engage one another at mating flanges so as to form an air passage between a fan and a cooling module of the vehicle. The upper section of shroud includes an aspirator portal in an upper surface thereof. An aspirator is provided having an air intake and an air outlet. The aspirator is supported in the lower section of the shroud proximal to the fan with the air outlet facing the fan. An engine intake air pre-cleaner unit having an air intake, an aspirator port, and an air exhaust is mounted to the shroud by aligning mounting tabs on the pre-cleaner with mounting bosses on the shroud so that the aspirator port is disposed in proximity to the aspirator portal in the upper section of shroud. One end of an aspirator hose is connected to the aspirator port of the pre-cleaner and passes through the aspirator portal. The other end of the aspirator hose is connected to the air intake of the aspirator. The aspirator hose passes generally through the middle of the shroud from the upper section to the lower section. The vacuum necessary for proper aspiration of the pre-cleaner is accomplished by air movement, induced by the fan, between the air intake of the pre-cleaner and the aspirator via the aspirator port and the aspirator hose. No additional hoses or fittings are required outside the shroud to provide aspiration to the pre-cleaner so that considerable space is conserved under the vehicle hood.

9 Claims, 5 Drawing Sheets

FAN SHROUD WITH INTERNAL ASPIRATOR

FIELD OF THE INVENTION

The present invention relates generally to air intake systems for internal combustion engines. More particularly, the present invention relates to such systems which employ a pre-cleaner. Specifically, the present invention relates to aspirators for supplying a vacuum to such pre-cleaners.

BACKGROUND OF THE INVENTION

Engine air intake systems for work vehicles frequently include a pre-cleaner to remove dirt particles from the intake air prior to the air filter. Many pre-cleaners require a vacuum to pull or "scavenge" dirt particles from the fresh air ingested into the air intake system. Exhaust system aspirators have been used to supply the required vacuum. An exhaust system aspirator, however, creates a restriction in the engine exhaust, raises noise levels and raises the cost of the muffler and/or exhaust pipe. Also, a check valve is needed to prevent back flow of high temperature gases into the pre-cleaner and high temperature hoses must be used.

An alternative approach is to use a fan shroud aspirator as a source of vacuum to a pre-cleaner. This aspirator is typically an opening in the fan shroud linked to the pre-cleaner by a hose. For cost and space savings, it is desirable to reduce the number of extraneous parts required for pre-cleaner aspiration. Modern agricultural tractors and other work vehicles sometimes require a rather long fan shroud to fill the gap between the cooling module and the fan. Thus it is desired to integrate the pre-cleaner aspirator into the fan shroud itself to reduce parts counts and costs and also to satisfy space constraints.

SUMMARY OF THE INVENTION

In view of the foregoing, it is an object of the invention to provide aspiration for a work vehicle pre-cleaner.

Another object of the invention is the provision of a fan shroud between the fan and the cooling module of a work vehicle.

A further object of the invention is to provide a fan shroud for a work vehicle which has the pre-cleaner aspirator integrated therein.

An additional object of the invention is the provision of such a fan shroud and aspirator which is compatible with known manufacturing and assembly techniques and equipment.

Still another object of the invention is the provision of such a fan shroud aspirator which utilizes a minimal number of parts and optimizes the use of space under the hood of the vehicle.

The foregoing and other objects of the invention together with the advantages thereof over the known art which will become apparent from the detailed specification which follows are attained by a fan shroud having an integrated aspirator for use in conjunction with a pre-cleaner, the pre-cleaner having an air intake, an aspirator port, and an air exhaust, and wherein a first end of the shroud is adapted for disposal proximal to a cooling module while a second end is adapted for disposal proximal to a fan, the fan shroud comprising: an aspirator portal in an upper surface of the shroud; an aspirator having an air intake and an air outlet, the aspirator being supported inside the shroud proximal to the fan with the air outlet facing the fan; and, a first end of an aspirator hose connected to the aspirator port of the pre-cleaner and passing through the aspirator portal and a second end of the aspirator hose connected to the air intake of the aspirator so that the aspirator hose passes generally through a mid-section of the shroud; whereby the vacuum necessary for proper aspiration of the pre-cleaner is accomplished by air movement, induced by the fan, between the air intake of the pre-cleaner and the aspirator via the aspirator port and the aspirator hose.

In general, a fan shroud is provided having of upper and lower sections. The sections are designed to mateably engage one another at mating flanges so as to form an air passage between a fan and a cooling module of the vehicle. The upper section of shroud includes an aspirator portal in an upper surface thereof. An aspirator is provided having an air intake and an air outlet. The aspirator is supported in the lower section of the shroud proximal to the fan with the air outlet facing the fan. An engine intake air pre-cleaner unit having an air intake, an aspirator port, and an air exhaust is mounted to the shroud by aligning mounting tabs on the pre-cleaner with mounting bosses on the shroud so that the aspirator port is disposed in proximity to the aspirator portal in the upper section of shroud. One end of an aspirator hose is connected to the aspirator port of the pre-cleaner and passes through the aspirator portal. The other end of the aspirator hose is connected to the air intake of the aspirator. The aspirator hose passes generally through the middle of the shroud from the upper section to the lower section. The vacuum necessary for proper aspiration of the pre-cleaner is accomplished by air movement, induced by the fan, between the air intake of the pre-cleaner and the aspirator via the aspirator port and the aspirator hose. No additional hoses or fittings are required outside the shroud to provide aspiration to the pre-cleaner so that considerable space is conserved under the vehicle hood.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
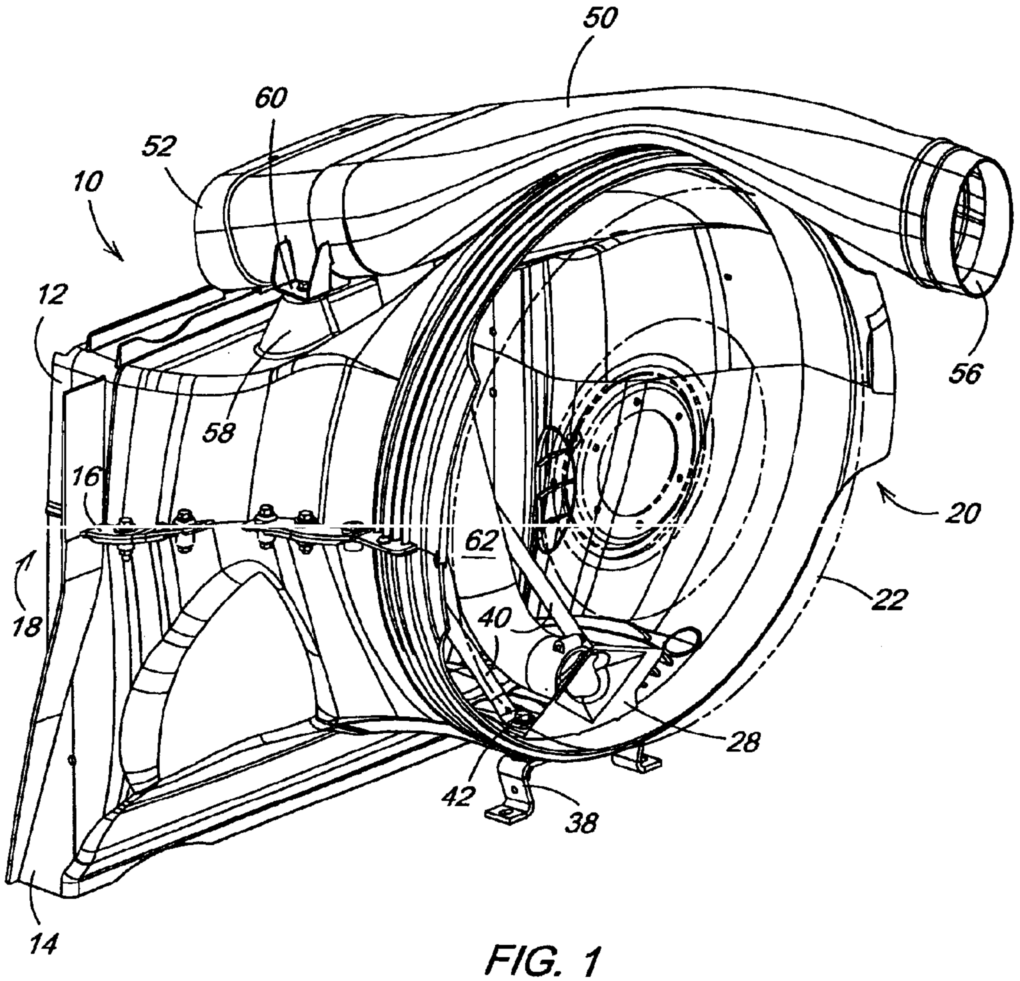
FIG. 1 is a perspective view of a fan shroud and pre-cleaner assembly according to the invention.
Figure 2:
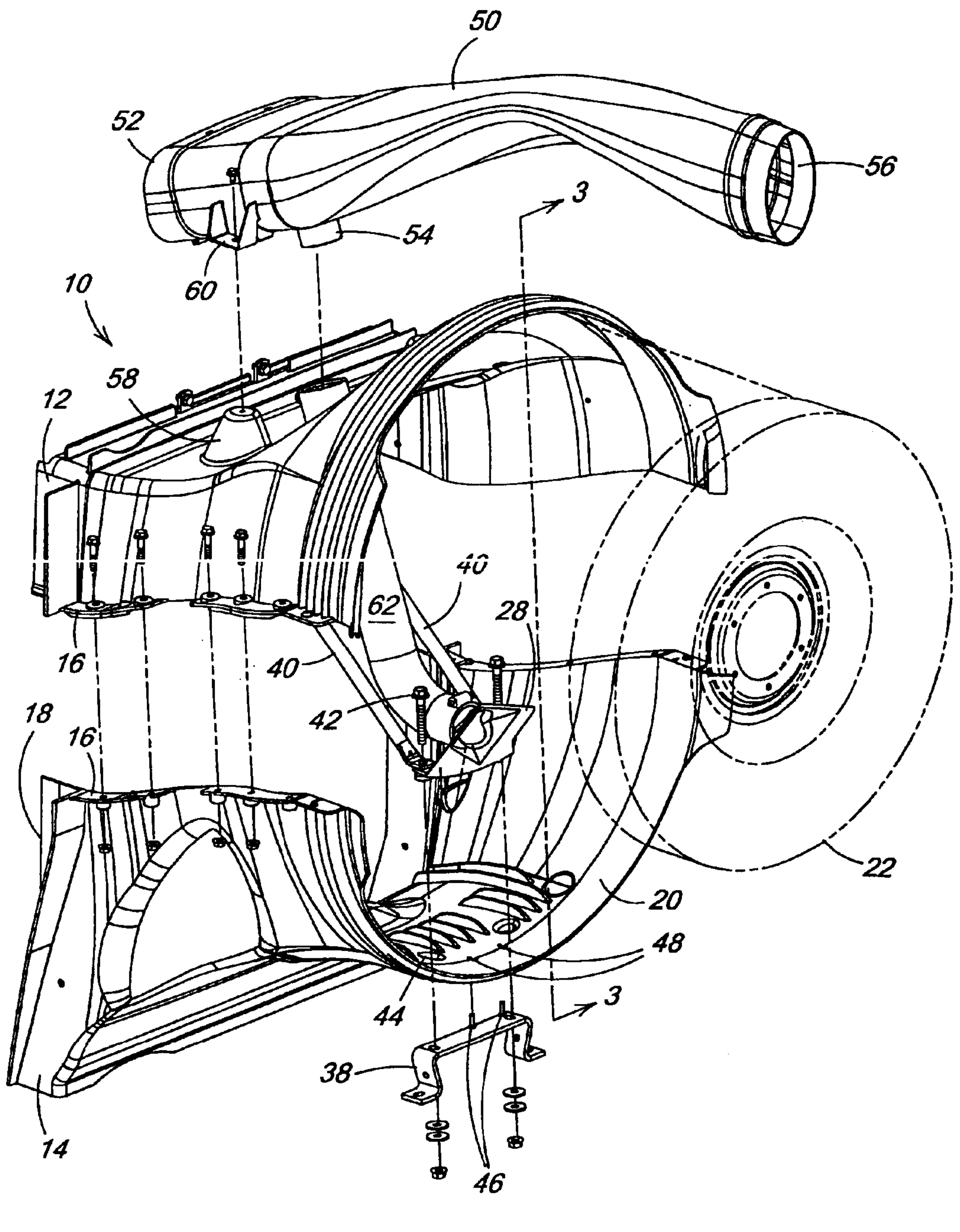
FIG. 2 is an exploded perspective view of the assembly of FIG. 1.
Figure 3:
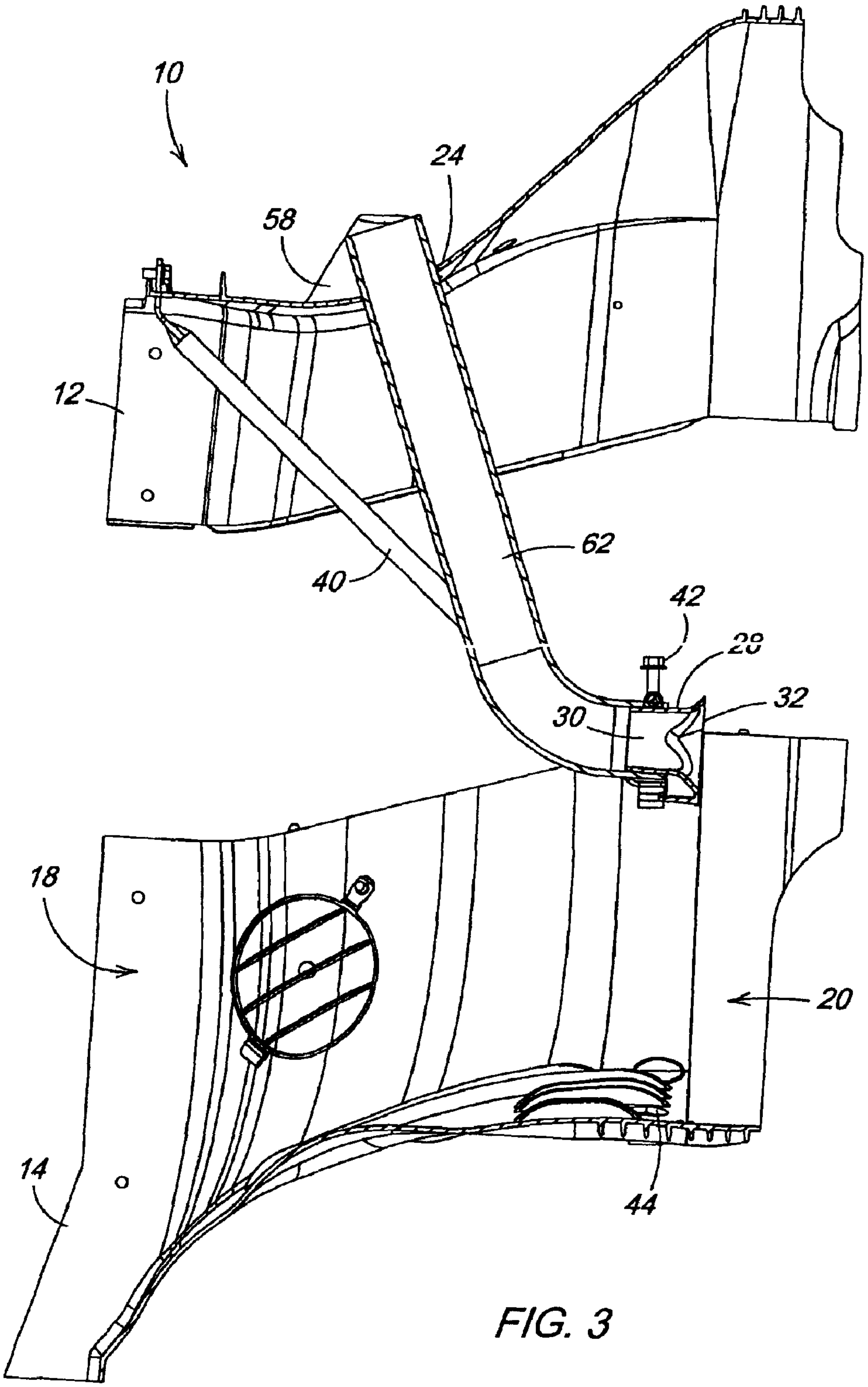
FIG. 3 is a cross-sectional view taken along the line 3—3 of FIG. 2.
Figure 6:
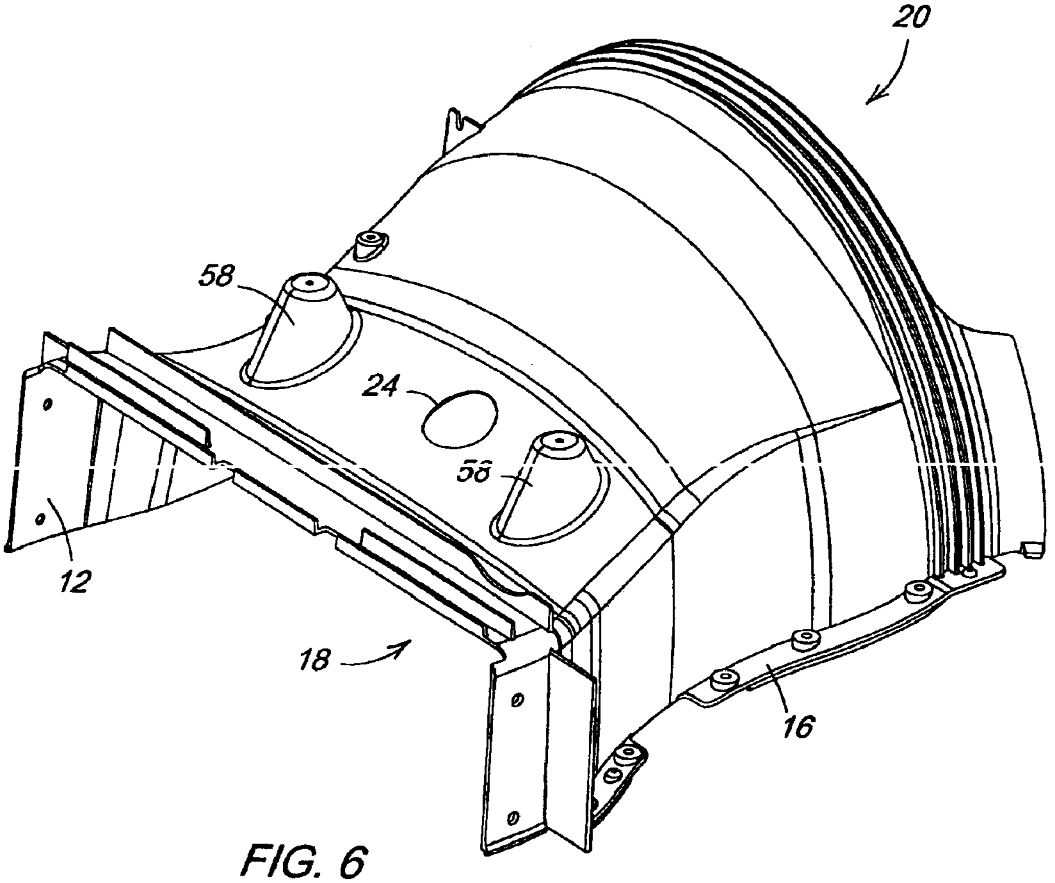

With reference now to the drawings and particularly FIGS. 1–3, it can be seen that a fan shroud having an internal aspirator according to the invention is designated generally by the numeral 10. As shown the fan shroud 10 is comprised of an upper section 12 and a lower section 14 and is preferably formed of a thermoplastic or thermoset material in an appropriate conventional molding process. The upper section 12 and the lower section 14 are designed to mateably engage one another at mating flanges 16 so as to form an air passage between a fan and a cooling module of the vehicle. Accordingly, a first end 18 of the shroud 10 is adapted for disposal proximal to the cooling module (not shown) while a second end 20 is adapted for disposal proximal to the fan 22. Thus air is drawn through the cooling module by the fan 22. As is perhaps best shown in FIG. 6 the upper section of shroud 10 includes an aspirator portal 24 in an upper surface 26 thereof.

Figure 4:
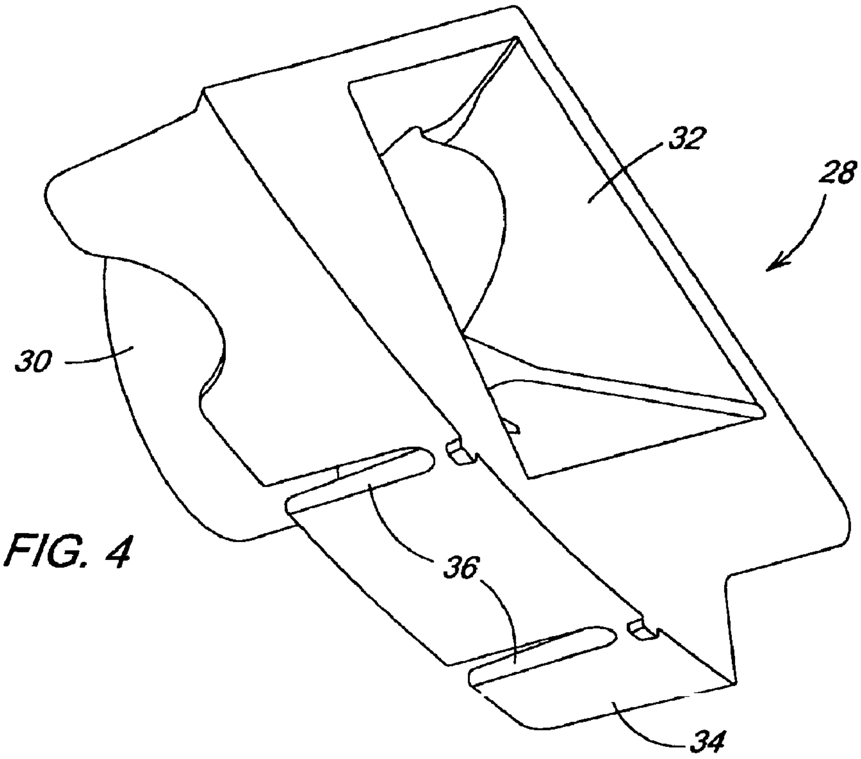
FIG. 4 is a perspective bottom view of an aspirator according to the invention.
Figure 5:
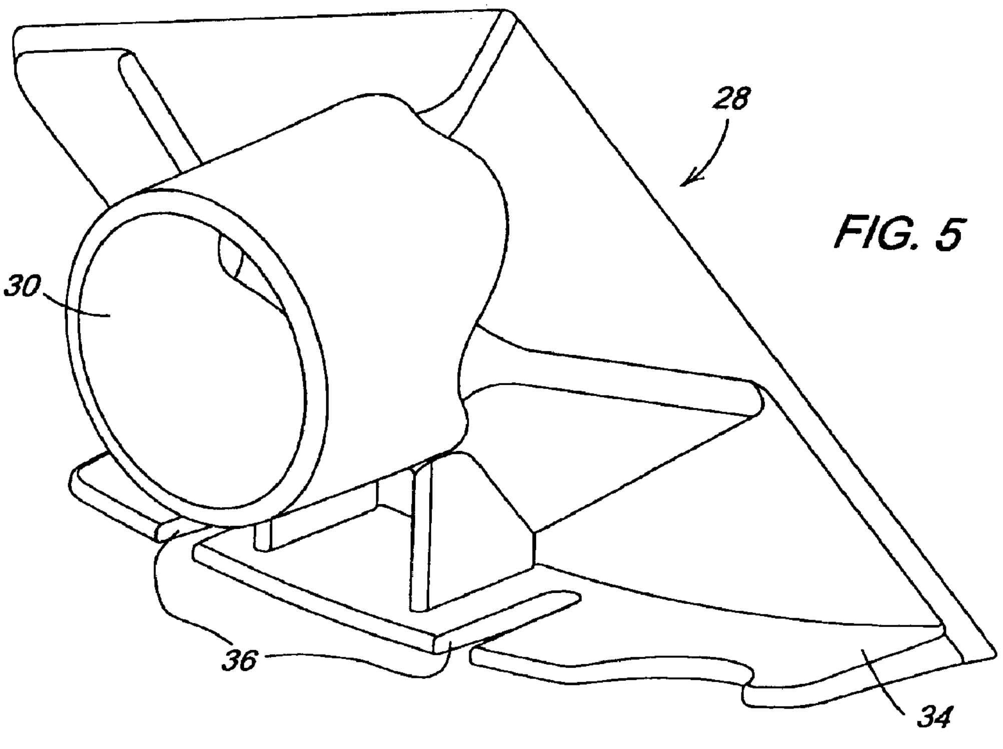
FIG. 5 is a perspective side view of an aspirator according to the invention; and, FIG. 6 is a perspective top view of the upper section of the fan shroud according to the invention.

Referring now to FIGS. 4 and 5 an aspirator 28 is illustrated. The aspirator 28 has an air intake 30 and an air outlet 32. The air intake 30 is essentially a nozzle which is adapted to be connected with an appropriate hose. The aspirator 28 further includes a mounting flange 34 which has a pair of fastener slots 36. Referring again to FIGS. 1 and 2 it will be seen that a support bracket 38 is provided for supporting the lower section 14 of the shroud 10 to the vehicle structure (not shown). A pair of support standards 40 are provided to support the upper section 12 relative to the lower section 14. Accordingly, fasteners 42 are provided to attach the standards 40 to the bracket 38 by way of apertures 44. Additional fasteners 46 are provided to secure the aspirator 28 to the lower section 14 of shroud 10 and the bracket 38 by way of apertures 48 and fastener slots 36. Thus the aspirator 28 is supported in the lower section 14 of the shroud 10 proximal to the fan 22 with the air outlet 32 facing the fan 22.

Referring again to FIGS. 1–3, an engine intake air pre-cleaner unit 50 includes an air intake 52, an aspirator port 54 and an air exhaust 56. In use, air is drawn in through the air intake 52, dirt particles are "scavenged" from the air, and the cleaned air exits the pre-cleaner 50 at the air exhaust 56 which is connected to the engine intake (not shown). The pre-cleaner 50 is aspirated through the aspirator port 54 via a vacuum provided by the fan 22 as will be described below.

As shown in FIGS. 1–3 and 6 a pair of pre-cleaner mounting bosses 58 are provided on the upper section 12 of the shroud 10 as shown. The mounting bosses 58 correspond to mounting tabs 60 provided on the pre-cleaner housing. Thus the pre-cleaner 50 is mounted to the shroud 10 by way of appropriate fasteners. When the mounting tabs 60 are aligned with the mounting bosses 58 the aspirator port 54 is positioned such that it is disposed in proximity to the aspirator portal 24 in the upper section 12 of shroud 10. One end of an aspirator hose 62 is connected to the aspirator port 54 of the pre-cleaner 50 and passes through the aspirator portal 24. The other end of the aspirator hose 62 is connected to the air intake 52 of the aspirator 28. As should now be apparent the aspirator hose 62 passes generally through the middle of the shroud 10 from the upper section 12 to the lower section 14. The vacuum necessary for proper aspiration of the pre-cleaner 50 is accomplished by air movement, induced by the fan 22, between the air intake 52 of the pre-cleaner 50 and the aspirator 28 via the aspirator port 54 and the aspirator hose 62. Thus no additional hoses or fittings are required outside the shroud 10 to provide aspiration to the pre-cleaner 50 so that considerable space is conserved under the vehicle hood.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A fan shroud having an integrated aspirator for use in conjunction with a pre-cleaner, the pre-cleaner having an air intake, an aspirator port, and an air exhaust, and wherein a first end of the shroud is adapted for disposal proximal to a cooling module while a second end is adapted for disposal proximal to a fan, the fan shroud comprising:

an upper section and a lower section mateably engaging one another at mating flanges so as to form an air passage between a fan and a cooling module of the vehicle;

an aspirator portal in an upper surface of the shroud;

an aspirator having an air intake and an air outlet, the aspirator being supported inside the shroud proximal to the fan with the air outlet facing the fan; and, a first end of an aspirator hose connected to the aspirator port of the pre-cleaner and passing through the aspirator portal and a second end of the aspirator hose connected to the air intake of the aspirator so that the aspirator hose passes generally through a mid-section of the shroud;

whereby the vacuum necessary for proper aspiration of the pre-cleaner is accomplished by air movement, induced by the fan, between the air intake of the pre-cleaner and the aspirator via the aspirator port and the aspirator hose.

2. A fan shroud as described in claim 1 wherein the air intake of the aspirator is a nozzle adapted to be connected with the aspirator hose.

3. A fan shroud as described in claim 1 wherein the aspirator includes a mounting flange having at least one fastener slot.

4. A fan shroud as described in claim 3 wherein a support bracket is provided for supporting the lower section of the shroud to the vehicle structure.

5. A fan shroud as described in claim 4 wherein one or more fasteners secure the aspirator to the lower section of the shroud and the bracket by way of at least one aperture and the at least one fastener slot.

6. A fan shroud as described in claim 1 wherein at least one pre-cleaner mounting boss is provided on the upper section of the shroud.

7. A fan shroud as described in claim 6 wherein the at least one mounting boss corresponds to at least one mounting tab provided on the pre-cleaner housing.

8. A fan shroud as described in claim 7 wherein when the at least one mounting tab is aligned with the at least one mounting boss the aspirator port of the pre-cleaner is positioned such that it is disposed in proximity to the aspirator portal in the upper section of shroud.

9. A fan shroud as described in claim 1 wherein the fan shroud is formed of a thermoplastic or thermoset material.

* * * * *